United States Patent [19]
Woodhams

[11] Patent Number: 5,474,722
[45] Date of Patent: Dec. 12, 1995

[54] ORIENTED THERMOPLASTIC AND PARTICULATE MATTER COMPOSITE MATERIAL

[75] Inventor: Raymond T. Woodhams, Toronto, Canada

[73] Assignee: The Governing Council of the University of Toronto, Toronto, Canada

[21] Appl. No.: 151,031

[22] Filed: Nov. 12, 1993

[30] Foreign Application Priority Data

Nov. 13, 1992 [GB] United Kingdom .................. 9223781

[51] Int. Cl.$^6$ ............................. B29C 67/20; B29C 47/02
[52] U.S. Cl. ........................ 264/45.3; 264/45.5; 264/45.9; 264/108; 264/126; 264/323; 425/4 C; 425/817 C
[58] Field of Search ................................ 264/109, 323, 264/46.1, 45.9, 45.3, 45.5, 108, 126; 425/4 C, 817 C

[56] References Cited

U.S. PATENT DOCUMENTS

| | | |
|---|---|---|
| 3,764,442 | 10/1973 | Boutillier . |
| 3,879,505 | 4/1975 | Boutillier et al. .................. 264/45.5 |
| 3,922,328 | 11/1975 | Johnson ............................. 264/210.2 |
| 4,071,591 | 1/1978 | Kobayashi et al. ................. 264/45.3 |
| 4,178,411 | 12/1979 | Cole et al. ......................... 264/45.3 |
| 4,192,839 | 3/1980 | Hayashi et al. .................... 264/45.5 |
| 4,198,363 | 4/1980 | Noel .................................... 264/53 |
| 4,272,577 | 6/1981 | Lyng .................................... 264/108 |
| 4,518,552 | 5/1985 | Matsuo et al. ..................... 264/323 |
| 5,234,652 | 8/1993 | Woodhams et al. . |

FOREIGN PATENT DOCUMENTS

| | | |
|---|---|---|
| 3801574 | 8/1989 | Germany . |
| 48-23348 | 7/1973 | Japan ................................. 264/45.5 |
| 60-82319 | 5/1985 | Japan ................................. 264/45.3 |

OTHER PUBLICATIONS

Bibliography of Solid Phase Extrusion.
Meyers, et al: Bilbliograph "Composites from Plastics and Wood–Based Fillers", Apr. 1991.
Henrici–Olive et al: Integral/Structural Polymer Foams, Technology, Properties and Applications, pp. 111–122.
Collier, et al: Streamlined Dies and Profile Extrusion, Antec '87, pp. 203–206.
Collier, et al: High Strength Extrudates by Melt Transformation Coextrusion, Antec '87, pp. 497–502.
Woodhams, et al: Wood Fibers as Reinforcing Fillers for Polyolefins, Polymer Engineering and Science, Oct. 1984, vol. 24, No. 15, pp. 1167–1171.
Pronnimit et al: Extrusion of Self–Reinforced Polyethlene, Advances in Polymer Technoogy, vol. 11, No. 2, 91–98 (1991/1992) pp. 92–99.
Brzoskowski et al: Air–Lubricated Die for Extrusion of Rubber Compounds, pp. 945–956.
Meyers, et al Effects of Composition and Polypropylene Melt Flow on Polypropylene–Waste Newspaper Composites Proceedings of the 1992 annual conference of the Society of Plastics Engineers, May 1992, vol. 1, pp. 602–604.
Wood Fiber/Polymer Composites: Fundamental Concepts, Processes, and Material Options.

*Primary Examiner*—Jeffery R. Thurlow
*Attorney, Agent, or Firm*—Cushman, Darby & Cushman

[57] ABSTRACT

A process for the continuous production of a high modulus article comprising a composite of an oriented plastic material and an oriented particulate material, said process including the steps of:

a. continuously forcing an orientable plastics material, while it is close to or at its softening temperature and in admixture with an orientable particulate material, through a converging passage of which the cross-sectional area diminishes in the forward direction of plastic flow, thereby to produce an extrudate;

b. deforming the extrudate, while it is maintained at or close to its melt temperature, to produce an oriented, deformed extrudate; and c. cooling the deformed extrudate to preserve the orientation and provide said composite. The foamed and unfoamed composite articles have strength, modulus and density values comparable to typical hardwoods or softwoods.

11 Claims, 5 Drawing Sheets

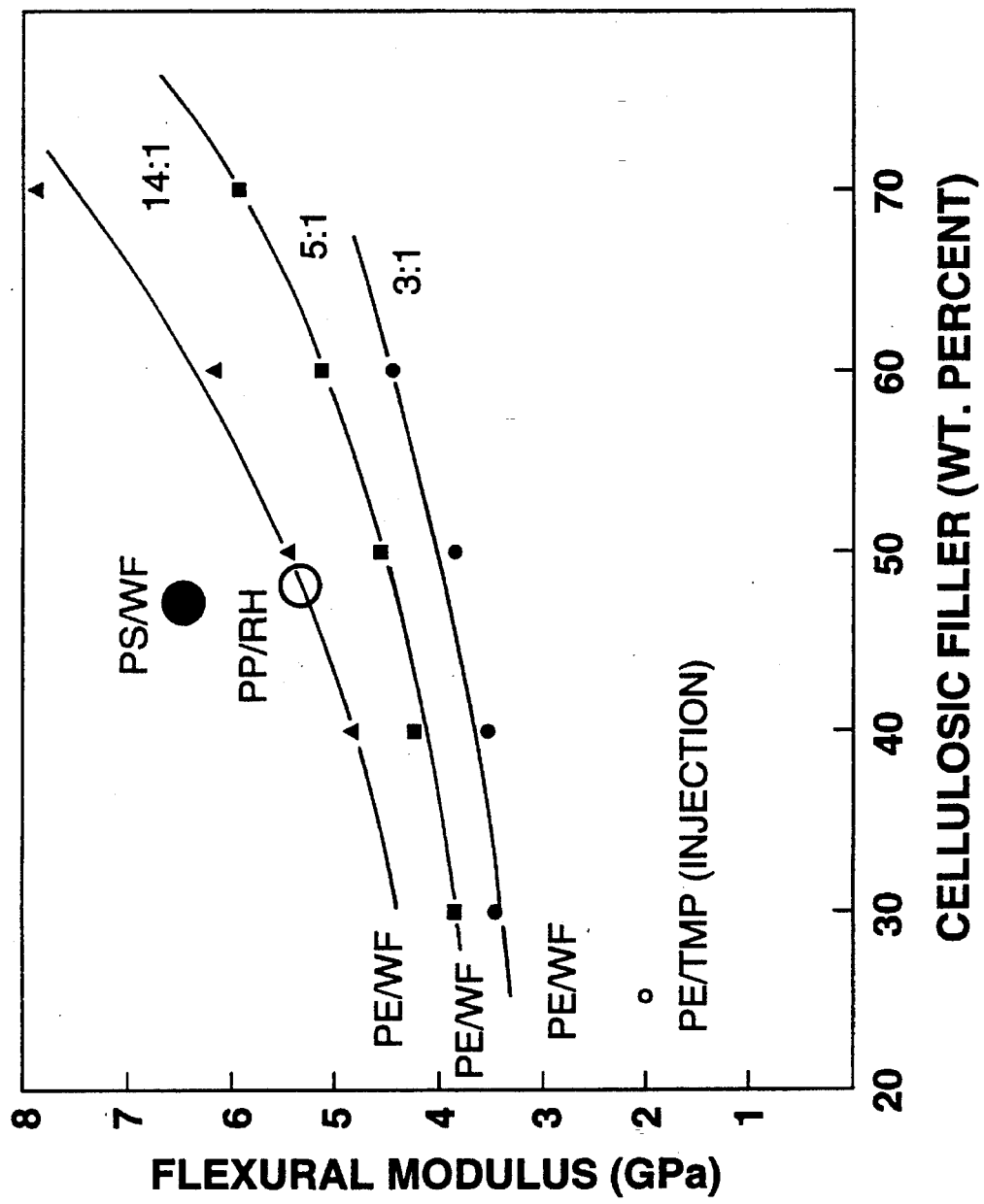

ORIENTED THERMOPLASTIC AND PARTICULATE MATTER COMPOSITE MATERIAL

FIELD OF THE INVENTION

This invention relates to fiber or flake reinforced thermoplastic composite materials and processes for their manufacture. In particular, it relates to cellulose fiber reinforced thermoplastic compositions and, more particularly, to foam compositions which have strength, modulus and density values comparable to typical hardwoods or softwoods; and processes for their manufacture.

BACKGROUND TO THE INVENTION

U.S. Pat. No. 5,234,652 to Woodhams et al, issued Aug. 10, 1993, describes processes for the melt phase extrusion of high molecular weight polyethylenes to produce extrudates having substantially both an increased modulus and increased strength in the flow direction. In the process described therein, the high molecular weight plastic material, at or near its melt temperature, is forced through a die having a converging passage so as to produce a highly oriented extrudate. The plastic material at the die interface is in substantially extensional i.e. plug flow through the converging die passage.

The invention described in U.S. Pat. No. 5,234,652 is based upon the proposition that polymer chains, when fully extended and oriented in parallel fashion, confer greatly increased strength and modulus to the resulting oriented extrudate. Although this concept has been extensively applied to fibers and films, attempts to apply this concept to thicker sections have been limited by the natural tendency of polymer chains to quickly recover their unstretched equilibrium conformations at elevated temperatures. This strain recovery often manifests itself in a phenomenon called die swell, in which the molten extrudate elastically retracts and expands as it exits the heated die. In U.S. Pat. No. 5,234,652, a process is described wherein a polymer is extruded in the semi-solid state, viz. melt phase extrusion under conditions that forcibly extrude and extend the flexible polymer chains in the flow direction and retain such imparted orientation in the extrudate. Under such melt state extrusion conditions at low extrusion temperatures, sufficiently high molecular weight and plug flow, the molecular relaxation times are sufficiently long that product orientation is largely retained during and after cooling to ambient temperatures. High molecular weight polyethylenes were identified as particularly suitable for this process.

Various extrusion processes are known for the continuous production of integral structural foam products. Of particular relevance is U.S. Pat. No. 3,764,642—P. E. Boutillier, issued Oct. 9, 1973. These processes use the so-called "Celuka die" and provide a high-density, rigid skin extruded product of desired size having an inner foamed core.

Whereas hydrostatic extrusion of polmers has been known for some time (N. Inoue, M. Nishihara, HYDROSTATIC EXTRUSION, Theory and Applications, Section 4, Polymers, Elsevier Applied Science Publishers, pp. 333–362, 1985) the process is normally restricted to ram extrusion which entails deformation of a billet under conditions similar to the hydrostatic extrusion of metals. The prior art with respect to extrusion dies is extensive, as will be understood from the published text by W. Michaeli (EXTRUSION DIES, Design and Engineering Computations, Hanser Publishers, 1984). However, the precise conditions for achieving steady smooth extrusion of highly oriented polymers without melt fracture or die swell are not generally known by those in the extrusion industry.

This invention reveals a method whereby most filled polymers may be readily extruded at or near their softening temperatures to directly produce a highly oriented profile.

SUMMARY OF THE INVENTION

I have found that orientable particulate material in the form of, for example, fiber or flake reinforced thermoplastic composites of exceptionally high strength and high modulus, rivalling the structural performance of natural softwoods and hardwoods can be made by extrusion processes. These processes orient both the thermoplastic polymeric chains comprising the matrix and the dispersed particulate material, in the longitudinal flow direction, and which solidifies the extruded profile in that preferred orientation, substantially preventing relaxation of the polymeric chains during the subsequent cooling period to ambient temperatures.

Flow orientation of the thermoplastic elastic melt deforms the equilibrium conformations of the chain molecules and imparts a preferential orientation of the chain segments in the flow direction. Such chain orientation increases the strength and modulus of the solid oriented structure in the direction of orientation. The term "orientable particulate" applies to anisotropic particles in which one dimension is much larger than another and which may be substantially oriented in one direction—parallel or planar arrangement. Such overlapping particles, typified by flakes and fibers, and embedded in a polymeric matrix are, thus, normally considered "reinforcing fillers".

The observed mechanical properties are a result of additive, or synergistic effects of these two mechanisms of reinforcement. The theory of such reinforcement is well understood in practice (short glass fibers, asbestos, mica, talc, wollastonite, wood fibers).

Thus, in one aspect, the invention provides a process for the continuous production of a high modulus article comprising a composite of an oriented plastic material and an oriented particulate material, said process including the steps of:

a. continuously forcing an orientable plastics material, while it is close to or at its softening temperature and in admixture with an orientable particulate material, through a passage of which the cross-sectional area diminishes in the forward direction of plastic flow, thereby to produce an extrudate;

b. deforming the extrudate, while it is maintained at or close to its melt temperature, to produce an oriented, deformed extrudate; and c. cooling the deformed extrudate to preserve the orientation and provide said composite.

By the term "orientable particulate material" is meant material in the form of fibres, flakes and the like, which can substantially orientate in parallel or planar arrangement as hereinbefore described. Preferably, the orientable particulate material is formed of a cellulosic material.

By the term "softening temperature" is meant that temperature near the melting point of a crystalline type polymer, or in the case of an amorphous polymer, the temperature near the glass transition temperature where there is an abrupt change in viscosity.

Thus, in a preferred aspect the invention provides a process of preparing high strength and high modulus cellulosic-thermoplastic composites, which comprises:

intimately admixing shredded cellulosic fibres or cellulosic particles with a thermoplastic polymeric material which has a softening point below about 220° C.;

extruding the mixture with converging flow through a die by solid state extrusion at a temperature near the softening point of the thermoplastic material, to impart longitudinal orientation of both the cellulosic macromolecules and the thermoplastic polymer molecules in the direction of extrusion;

and cooling the extrudate promptly after the orientation to solidify the extrudate and preserve the imparted orientation therein.

At least some of the desired orientation of the macromolecules may be imparted to the extrudate by a step of elongation or drawing of the extrudate as it issues from the extruder die.

The invention preferably provides a process as hereinabove defined in which the converging passage is provided in a die having a converging zone, which passage has a geometry which provides a decreasing strain rate of the elastic melt in the flow direction within the converging zone.

The invention more preferably provides a process as hereinabove defined in which the converging passage in the die has a geometry which provides a constant elongation rate of the elastic melt in the flow direction within the converging zone.

In a more preferred aspect the invention provides a process for the production of an integral structural foam composite of an oriented plastic material and an oriented particulate material, said process including the steps of intimately admixing suitably orientable particulate material with a thermoplastic material which thermoplastic has a softening point below about 220° C.;

extruding the admixture through a converging die at a temperature near the softening point of the thermoplastic material, so as to impart predominantly longitudinal orientation to both the particulate material and the thermoplastic polymer chains throughout the melted extrudate and under conditions which permit foaming to take place in the core of the extrudate while maintaining a highly oriented, essentially solid outer skin on the extrudate surface, while applying tension to the extrudate to maximize extrusion rates and reduce die pressures; and cooling the extrudate promptly after exit from the converging die to preserve the imparted orientation and prevent die swell and obtain the integral structural foam composite product.

The mean density of the extrudate is most easily controlled by the use of a foaming agent in which the preferred orientation of the solid outer skin is maintained. Preferably the admixture is extruded through a lubricated die which has been lubricated adjacent thereto as to provide substantially plug flow. The lubricating agent may be also or either provided in admixture with the thermoplastic-particulate materials.

In a preferred embodiment, the particulate material is cellulosic material obtained by the grinding, coating and fiberizing of suitable cellulosic fillers.

The combined influence of fiber orientation and polymer matrix orientation greatly increases the resultant strength and modulus in the direction of extrusion so that the obtained unidirectional composite compares favourably with the mechanical properties of wood. The average density of the extrudate may be readily adjusted by spontaneous foam expansion. In the case of "damp" cellulosic material, the moisture content of the wood filler can act as the "blowing agent". The endothermic cooling action of the water during vaporization helps to reduce the interior temperature of the extrudate in thicker sections, thereby reducing the external cooling requirements of the extrudate. The density and final dimensions of the extrudate may be precisely controlled by passing the extrudate through, for example, suitable water cooled calibrators or vacuum sizers as is known in the art. The cooled extrudate is characterized by a solid skin and a finely textured foam core wherein the overall density is determined by the density of the core and the thickness of the outer skin. Thus, the final product density may be controlled within certain limits to that of various wood species. The die head pressures after steady state has been reached are generally less than 42 MPa (6000 psig) and permit extrusion rates of 1.2 m/min (4 ft/min) using a conventional single screw extruder.

In conventional extrusion processes it is common practise to minimize elastic deformations which cause die swell. One purpose of the present invention is to maximize elastic deformations during extrusion and permanently retain such deformations in the extrudate. This is most readily achieved by extruding the melt near its softening point where the relaxation times of the polymer chains are sufficiently long to permit water quenching before substantial elastic recovery is able to take place. Using conventional screw extrusion methods, the die pressures can be excessive at these high viscosities and, preferably, proper die lubrication is employed to reduce friction. Moreover, startup conditions generally require that the melt temperature be gradually reduced until the preferred temperature profile is attained. Thus, melt state extrusion conditions must be approached gradually to avoid excessive pressures during startup.

The cellulosic component may be derived from any number of available sources such as ground wood, sawdust, wood flour, ground newsprint, magazines, books, cardboard, wood pulps (mechanical, stone ground, chemical, mechanical-chemical, bleached or unbleached, sludge, waste fines), laminated foils and various agricultural wastes (rice hulls, wheat, oat, barley and oat chaff, coconut shells, peanut shells, walnut shells, straw, corn husks, corn stalks, jute, hemp, bagasse, bamboo). The resin component may comprise virgin or recycled (waste) thermoplastics derived from the polyolefin family (polyethylenes, polypropylenes and copolymers thereof), vinyls (chiefly copolymers of vinyl chloride), and styrenics (including ABS and maleic anhydride copolymers thereof) and in some cases, mixtures of such polymers. Since wood, or cellulosic, fibres tend to decompose at temperatures above 220° C., resins which must be processed above this limiting temperature are generally excluded. Thus, a majority of the so-called engineering resins may not be employed in the process of the invention, since their softening temperatures are too high and would require processing temperatures greater than the cellulose decomposition temperature of 220° C. The process of the invention is also of less value with thermosetting resins such as phenolics, urea-formaldehyde resins, polyesters and epoxy resins, since these liquid resins are normally processed in a different manner.

Preferably, the plastic material is a polyethylene having a weight average molecular weight of between 20,000–500,000 daltons, and more, preferably, of between 30,000–300,000 daltons.

In order to utilize waste paper, newsprint, cardboard materials and the like, it is necessary to first shred the paper and then pass it through a hammer mill to open and partially fiberize the shredded paper. Wood waste may be passed through a hog mill before subjecting it to fine grinding with a hammer mill, Wiley Mill or Szego Mill. Minor contaminants such as sizing, paper additives, inorganic fillers, adhesives, paper glazes, wax coatings, pigments, food residues, and inks are normally tolerated without appreciable detriment to the extruded composite. However, the tolerance of such impurities or contaminants is largely determined by the intended application. Polar waxes, such as maleated polyolefins or fatty acids, may be advantageously employed during grinding to said the grinding process and provide a pretreated fibrous material which is rendered hydrophobic, densified and made free-flowing for use in gravity fed machinery. A weighed quantity of the cellulosic filler, thus fiberized and surface treated, is admixed with an appropriate resin and subjected to intensive mixing in a thermokinetic mixer such as a Gelimat (Werner and Pfleiderer Inc.) or K-Mixer (Synergistics Group Inc.). The intensive mixing not only separates the loosely bonded wood fibres from each other, but further disintegrates the individual wood fibres into much smaller wood fragments, with some wood fibres being reduced to a tenth of their original size. Despite this aggressive action, the resulting cellulosic fragments impart high strength and stiffness to the composite. Tests have shown that these composites may be reground and remolded numerous times (about 20) without significant loss of their mechanical properties. This remarkable durability is attributed to the extraordinary toughness of the cellulosic fragments which resist further breakage during reprocessing. It is usually necessary to employ dispersing agents or coupling agents in order to effectively mix wood or paper fibres with the thermoplastic resin, particularly with non-polar polyolefin resins, such as polyethylene and polypropylene which do not spontaneously wet cellulosic surfaces. In such cases, it has been found advantageous to add certain polar polymers or waxes such as carboxylic polyolefins, maleated polyolefins, or fatty acids. These additives can have a profound effect on the mechanical properties of the resulting composites in some cases. They may be added during the grinding and fiberization stage as described above or simply added to the resin mixture prior to intensive mixing according to preference. Pretreatment of the cellulosic fibres during the grinding stage is particularly desirable in order to increase the bulk density and provide a reinforcing filler which is acceptable for use in other types of compounders such as twin screw mixers, single screw mixers and Banburys. Various other additives may be incorporated during the compounding stage such as antioxidants, ultraviolet stabilizers, lubricants, fire retardants, pigments, blowing agents, or crosslinking agents.

The wood fibre concentration may be varied but the mixture becomes more difficult to extrude at concentrations of wood fiber greater than about 80% by weight. In order to maximize the orientation of the wood fibres, the die preferably employs a converging flow with surface lubrication. The lubrication helps to promote extensional flow of the molten extrudate (as opposed to conventional shear flow) so that all the wood fibres throughout the cross section are preferentially oriented in the direction of extrusion, i.e. the flow orientation imparts a parallel wood-like grain throughout. This uniform parallel orientation maximizes the strength and stiffness in the longitudinal direction. If properly chosen, the liquid lubricant may be a suitably pigmented monomer applied as a coating such that the monomer may be subsequently polymerized after extrusion (e.g. ultraviolet or electron beam curing). Unlubricated shear flow adopts a parabolic flow profile which disrupts the preferred parallel orientation.

This preferential orientation of the wood fibres partially contributes to the strength and stiffness of the composite. Additional stiffness and strength is imparted by extruding the composite under conditions that extend and orient the polymer chains (or crystalline fibrils) such that the orientation is "frozen in" by cooling the extrudate before it has an opportunity to relax. This method of extrusion is referred to as "melt" state extrusion in this specification and is normally conducted near the softening point of the resin (whether crystalline or amorphous) such that the relaxation times of the polymer chains are very long ie. it requires a long time to recover equilibrium chain conformations after elastic deformation in the converging die region, relative to the total time of extrusion. Consequently, the lowest practical extrusion temperature is, preferably, elected in order to prolong polymer relaxation times, thereby preserving most of the orientation imparted by the converging die in the finished product. The extrudate is further, generally, cooled by a series of calibrators or water cooling baths before final cutting and stacking. To minimize the extrusion pressure and promote extensional flow in the die zone, surface lubrication is employed. Suitable lubricants include silicone oils (Dow Corning Inc.), liquid paraffins, ACuflow (Allied-Signal Inc.), glycerine, castor oil, fatty amides and titanates (Kenrich Chemical Co.). The die assembly may be fitted with a porous metal lubrication insert ring to promote even distribution of the lubricant before it enters the die. The lubricants are metered at controlled rates using high pressure pumps. Vapours or gases may be introduced under pressure by such means to essentially reduce the interfacial friction to zero (Brzoskowski et al, Rubber Chemistry and Technology 60(5), 945–956, 1987). Water may be injected at such ports in order to provide simultaneous lubrication and cooling of the interface during extrusion. In certain cases it may be desirable to admix liquid and gaseous lubricants for minimizing friction in the converging zone. A puller is, preferably, employed to apply tension to the extrudate so that die swell is minimized and the die pressure reduced. It will be evident that any friction encountered by the semi solid compound as it passes through the die assembly will limit the extrusion rate. A series of water cooled calibrators, water bath or water spray system are, generally, employed to rapidly cool the extrudate before entering the puller. The tension applied to the extrudate by the puller is accurately controlled to maximize the extrusion rate without causing rupture of the extrudate by applying too much tension. After leaving the puller, the extrudate may be cut to any desired length, packaged and stored.

In a further aspect, the invention provides a high modulus article comprising a composite of an oriented plastics material and an oriented particulate material made by a process according to the invention as hereinbefore defined.

BRIEF DESCRIPTION OF THE DRAWINGS

In order that the invention may be better understood, preferred embodiments will now be described by way of example only with reference to the accompanying drawings, in which:

FIG. 6 represents a graph illustrating the solid phase extrusion with three different die configurations to demonstrate the effect of orientation on the flexural moduli of polyethylene composites containing various concentrations of wood flour. The target modulus is 10 GPa.

DETAILED DESCRIPTION OF THE DRAWINGS

Figure 1:
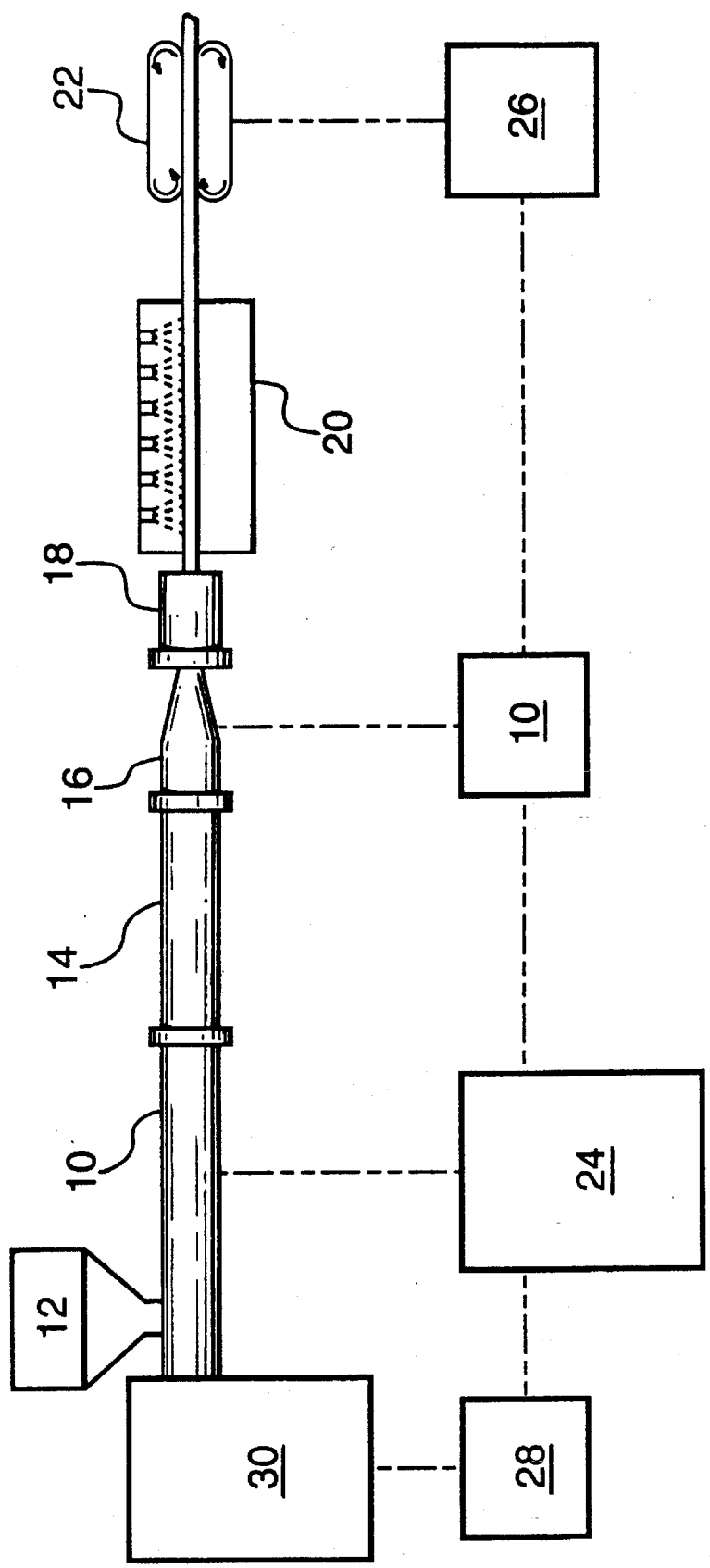
FIG. 1 is a schematic representation of the major components of an apparatus for carrying out the melt phase extrusion process of the invention.

With reference to FIG. 1 the apparatus for melt phase extrusion according to the invention comprises a variable speed extruder 10 which heats and plasticates the polymeric admixture supplied through hopper 12 to a melt reservoir 14 prior to entering a streamlined converging die 16. After exiting die 16, the solid extrudate is further quenched by a series of calibrators 18 and a water spray 20 before entering a puller 22. Each stage of the process is controlled by a programmed computer 24 (Barber Colman MACO 8000). The takeoff tension may be controlled with a load cell (not shown) to avoid fracture of the extrudate.

In special situations, it is also feasible to employ a melt gear pump to supply constant high pressure to the die, thereby avoiding surging. The screw of extruder 10 is driven by a variable speed drive 30 having a drive control 28. The temperature of die 16 is monitored and controlled by heat exchanger or electrical heating controls 32. Puller 22 is subjected to take-off speed controller 26. These process control features are well-known in the art.

Figure 2:
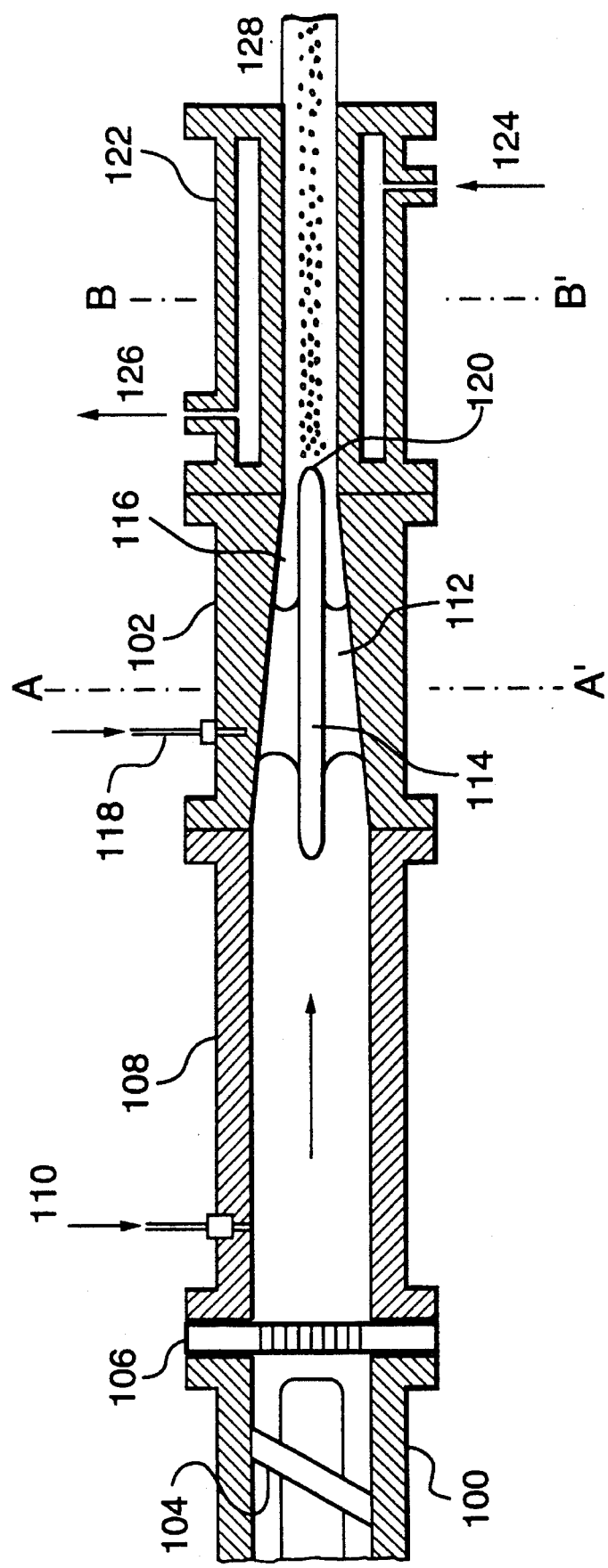
FIG. 2 is a schematic axial cross-sectional view of the major components of the apparatus of FIG. 1.

With reference to FIG. 2, extruder 100 accepts, melts, mixes, plasticates and forcibly extrudes the semi-solid or molten mass through heated converging die 102. Extruder 100 is a conventional single or twin screw machine with appropriate screw(s) 104 for the particular mix. An optional breaker plate 106 helps to minimize surging and spiralling of the melt as it enters reservoir 108. The reservoir may be of any length or diameter for the purpose of providing a uniformly conditioned mass of compound prior to forming and orientation in the die zone. Reservoir 108 may also contain static mixers to promote temperature uniformity and minimize spiralling caused by extruder screw 104.

Liquid or gaseous lubricant is introduced into reservoir 108 through one or more positioned ports 110, which serve to spontaneously and evenly distribute the lubricant between the molten mass and the surface of the reservoir as the mass moves forward into die 102. To further minimize friction, all internal surfaces are highly polished and made of corrosion resistant metal. Optionally, the lubricant may be uniformly distributed at the interface through a porous metal ring insert (not shown). It is also feasible to introduce the lubricant in the resin compound before it enters the extruder. Such efficient lubricants can impair the pumping efficiency of extruder 100 unless the extruder barrel is grooved. The grooves may be either parallel or spiral and serve to prevent the molten mass from sliding as a result of insufficient viscous drag.

The melt reservoir serves the following functions:

(a) minimizes flow instabilities such as spiralling of the melt due to the applied torque of the screw;

(b) minimizes striations caused by the presence of a breaker plate. This is especially important at lower extrusion temperatures;

(c) permits enlarged zone diameter (increased cross sectional area) before the melt enters the the die entrance. This is sometimes desirable to permit greater extrusion draw ratios and correspondingly increased orientation in the extrudate in the case of smaller extruders;

(d) permits gradual transition from a circular cross section to a more complex die profile, ie. streamlining. This gradual transition aids extensional flow throughout the passage;

(e) promotes even distribution of lubricant at the surface of the melt before it enters the die. The lubricant may be injected at a single port or distributed around the circumference through a porous ring insert. A short residence time in the reservoir is desirable to uniformly lubricate the polymer mass and the equilibrate the interface before it enters the die; and (f) control the melt temperature and melt uniformity prior to entering the converging die.

Die 102 embraces a mandrel 112 to permit the extrusion of hollow shapes or foam profiles. By suitable choice of conditions, mandrel die 112 is employed for the manufacture of integral structural foam profiles wherein the molten core is allowed to foam while the cooled surface is maintained solid. In the embodiment shown, the foaming action is provided by the naturally adsorbed moisture in the particulate cellulosic filler used, although other foaming agents may be employed for the same purpose.

Die 102 in FIG. 2 has an appropriate configuration according to the shape of the desired profile. However, there are important differences in the design of the die which distinguish it from conventional extrusion dies. Computer software is commonly available to contour dies for "streamline flow" as in the extrusion of metals (Collier et al, Society of Plastics Engineers Conference, p. 203 and 497, 1987).

Extensional flow inside the converging die can be facilitated by appropriately lubricating the skin of the polymer stream so that surface friction is minimized. This having been achieved, the velocity distribution or strain rate in the die zone is determined by the particular die geometry and has an important influence on the extent of deformation and the overall rate of extrusion. The deformation of a polymer melt inside a die can be described either in terms of an extensional strain rate É defined as $$\dot{E} = \frac{l}{t}$$

wherein l represents $dl/dt$ where l is length or distance in the direction of extrusion and t is time, normally in seconds (SI nomenclature); or an elongation (stretch) rate λ wherein $$\lambda = \frac{l}{l_o}$$

where $l_o$ is the initial length of a polymer element before it enters the die, and "l" is the length of the polymer element at any instant "t" after entering the die zone.

In general, the extensional strain rate flow profile along an axis beginning at the die entrance may be (a) constant, (b) increasing function, or (c) decreasing function of the strain rate. For the majority of cases, type (c) is preferred. A special case of the type (c) die design is a contour which imparts a constant stretch rate, with a stress distribution along the axis which is nearly constant, since the strain hardening compensates for the decreasing strain rate. In this case the die can be much shorter than a constant strain rate die for a particular stretch rate. Accordingly, a constant stretch rate die profile is preferred for extensional flow orientation. For best results, all die sections should be preferably streamlined to maximize the flow rate and avoid flow discontinuities. These considerations will apply to all thermoplastics and their composites.

In general, the rheology of the compound, the interfacial friction in the die zone, and the operating conditions will determine the optimum die configuration for a preferred degree of orientation. The die draw ratio is defined as the effective area of the die inlet to the effective area of the die outlet and is designed to impart permanent elastic deformation and preferred orientation to the fibrous composite. In order to promote maximum orientation of the wood fibres and at the same time orient the polymer matrix in the flow direction it is desirable to force the extrudate through a converging die having a streamline horn shape in the example of a simple rod profile such that the draw ratio or area reduction ratio in passing from the large entrance region to the smaller exit region imparts a permanent deformation to the viscoelastic melt. The contour of the die may be mathematically correlated to the viscoelastic deformation of the melt in terms of the elongational strain rate or elongational stress in the converging zone. Experience has shown that a constant or diminishing elongational strain rate is most effective.

With complex dies producing more complicated profile extrudates, it is desirable to employ computer software to determine the preferred shape and configuration of each section of the die passage.

In die 102, shown in FIG. 2, mandrel 112 with spider supporting members 114 is inserted in the die zone to produce a hollow section, such as a pipe. The converging passageway 116 surrounding mandrel 112 encourages elongational (plug) flow provided the external surface and the internal surfaces of the thermoplastic compound are adequately polished and lubricated to reduce friction. Thus, lubricant is metered under pressure through port 118 and exits at the forward tip (upstream) 120 of mandrel 112. This ensures that the inner surfaces of the molten mass are properly lubricated and reduces the viscous drag forces on mandrel 112. The temperature of each section of die assembly 102 is carefully controlled by external heating or cooling to promote elongational (stretching) flow in the die zone and then quickly quench the warm extrudate to retain the imparted fiber orientation and molecular orientation. In the examples hereinafter shown the die draw ratios in one series were 1:3, 1:5 and 1:14.

Extrusion of the elastic melt into a water-cooled calibrator 122 having water inlet port 124 and outlet port 126, causes production of integral structural foam rod 128.

The draw ratio inside the die must not exceed the natural draw ratio of the melt for the conditions of temperature, velocity flow gradient, and tensile force applied to the extrudate. For best results, it is desirable to employ resins having a large melt strength so that the applied tensile pulling force can assist smooth extrusion at high rates without encountering excessive die head pressures. Since melt strength and strain hardening become much larger as the temperature is decreased, it is desirable to extrude the molten composite near its softening point, where the viscosity is quite large and the relaxation time is long for the reversible elastic deformation. Obviously, there is a lower limit to the extrusion temperature since the extrudate may become too viscous to extrude and the die pressure could become excessive—which can rupture the die. The greatly increased viscosity near the softening point also implies longer relaxation times so that the elastic deformation is retained for a longer period of time, typically, at least several minutes. The extrudate will have sufficient time to solidify and freeze and so the polymer orientation imparted by the converging die will be permanently retained. In the case of melt extrusion as normally practised in industry the relaxation times of the extrudates are often measured in seconds so that any flow orientation is quickly lost before the extrudate is able to solidify. This can be directly observed by the use of polarized light since the extrudate will exhibit birefringence as long as molecular orientation is present. Long relaxation times and pure elastic deformation, as opposed to viscous deformation, are favored by the use of high molecular weight resins. However, the choice of molecular weight will be limited by the ability of the polymer to be mixed with wood fibres or other particulate filler so that a compromise is usually necessary between ease of mixing and retention time of orientation in the extrudate. Therefore, the highest molecular weight consistent with ease of mixing is normally preferred.

Extruded products having various profiles and dimensions may be produced by the process according to the invention. These include rods, pipes, hollow sections, structural foams, coextrusions, I-beams, channels, door and window frames, panels, etc. The outside diameter may vary from less than a millimeter to very large sections such as railway ties and telephone poles (30 cm). The larger sections may employ correspondingly larger diameter reservoirs fed by large or small extruders. The contour of the converging die, and the inlet and outlet dimensions are readily determined by computer using commercial software (employing streamline flow) in order to maximize the flow rate and impart a uniform draw ratio in the case of more complex shapes. The theory and design of streamline dies for drawing and extrusion is contained in various references of which the paper by O. Richmond is typical [O. Richmond, Theory of Streamlined Dies for Drawing and Extrusion, MECHANICS OF THE SOLID STATE, ed. F. P. J. Rimrott and J. Schwaighofer, University of Toronto Press, Toronto, 1968]. The viscoelastic response of a thermoplastic compound can influence the die contour for optimum extrusion rate and retained orientation.

Figure 3:
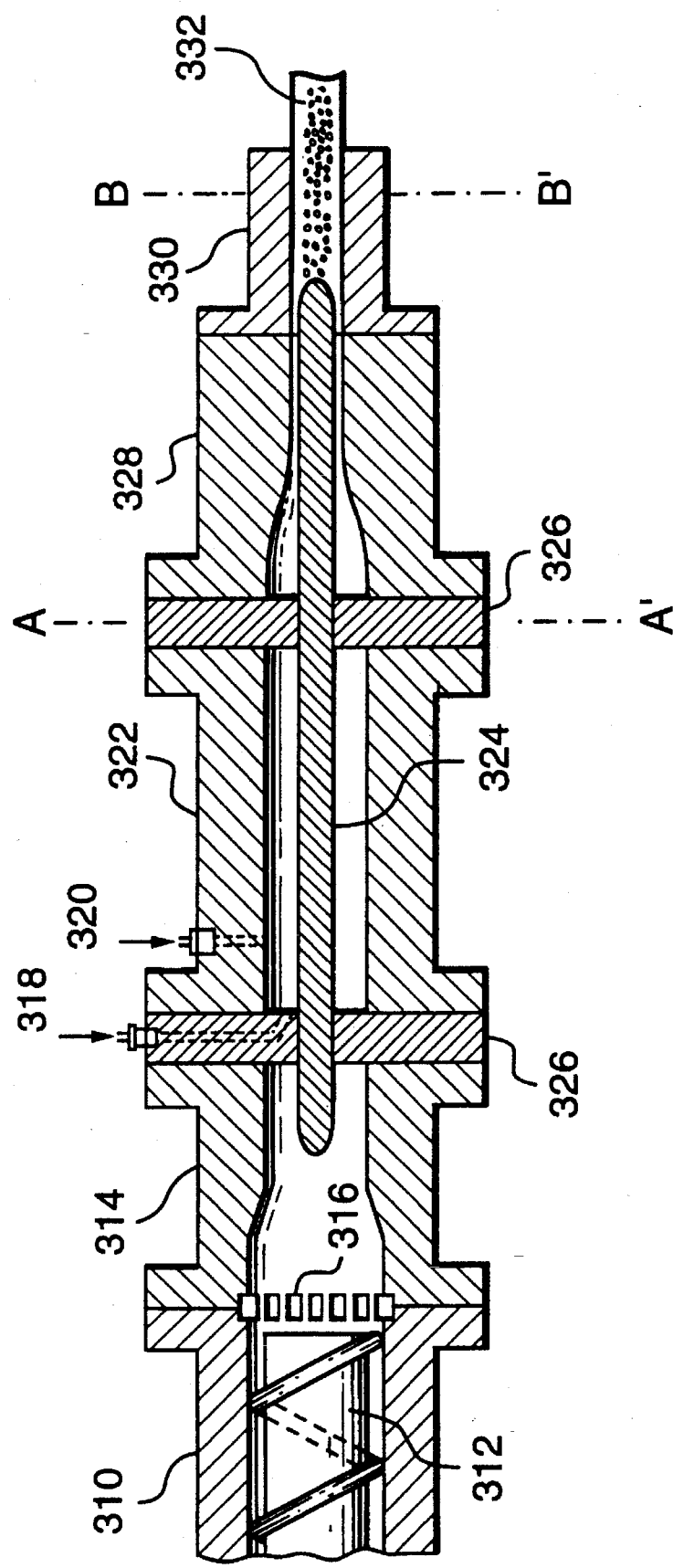
FIG. 3 is a schematic axial cross-sectional view of the major components of an alternative embodiment of the apparatus of FIG. 1.

With reference to FIG. 3, extruder barrel 310 holds an extruder screw 312 for feeding extrudate through orifices of metal breaker plate 316, leading to melt reservoir 314 used for conditioning the extrudate. Lubricant connection 318 allows of entry of a suitable lubricant for the surfaces of mandrel 324, while connection 320 allows entry of lubricant for lubrication of the outside surfaces of the melt and inner surfaces of melt reservoir 322 and converging die 328. Mandrel 324 is retained within the assembly by spider leg supports 326. Foamed composite rod 332 having a solidified skin emerges from calibrator 330 which further cools the extrudate.

Figure 4:
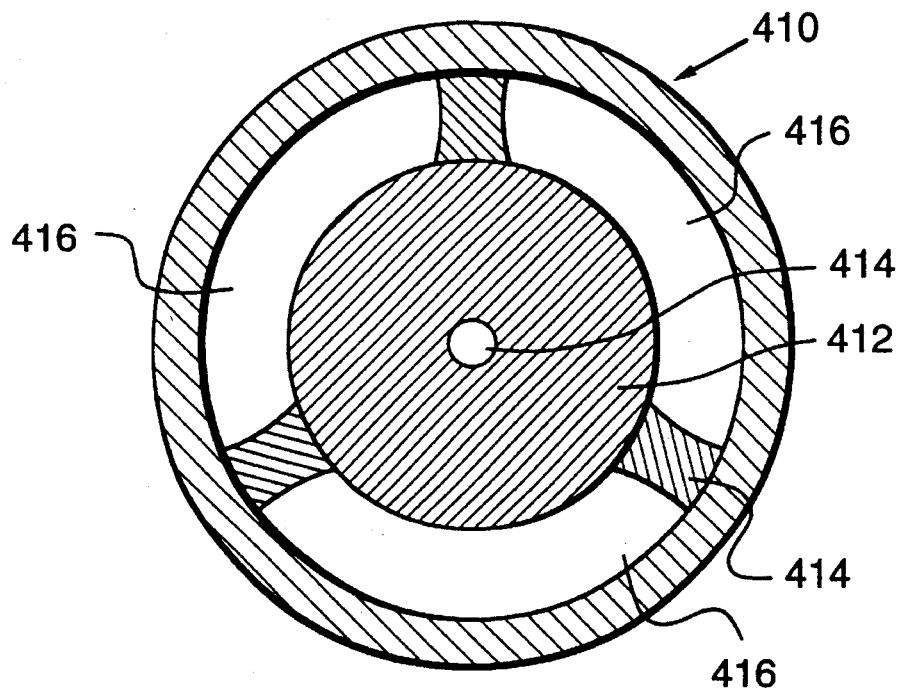
FIG. 4 represents a radial cross-sectional view along the line A–A' of a structural foam die and mandrel of FIGS. 2 and 3 assembly of use in the practice of the invention.

FIG. 4 shows a cross section of a structural foam die 410 having a central mandrel 412 containing a central lubricating channel 414 which conveys a lubricant to the leading edge (upstream) of mandrel 412. Mandrel 412 is rigidly fixed inside cylindrical die 410 by three equally spaced supports 414 which are streamlined to minimize flow turbulence. Converging annular channel 416 has a predetermined draw ratio to impart the desired orientation to the outer skin of the extrudate shown in FIG. 5. These internal surfaces are highly polished and lubricated to reduce friction to a minimum. The radial temperature profile can be controlled to permit foaming of the molten region nearest the mandrel. Foaming may be completely inhibited if the blowing agent is excluded or the interior is allowed to solidify before reaching the end of the mandrel (refer to FIG. 2). In this latter case a hollow section is produced. Thus, if the mandrel and spider supports are removed from the die then a solid section is obtained. Accordingly, the illustrated modular die can be designed to produce solid, hollow or integral foam profiles.

Figure 5:
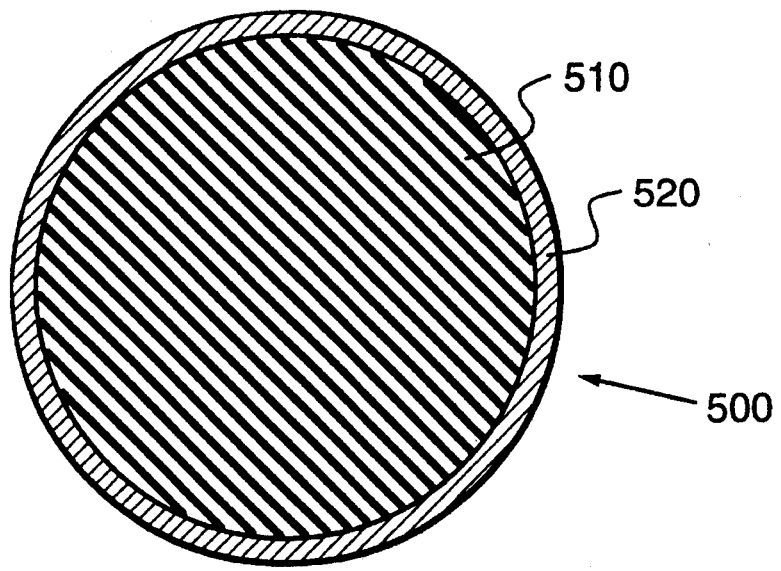
FIG. 5 represents a cross-sectional view along the line B–B' of a cylindrical foam profile produced from die assembly of FIGS. 2 and 3.

The cylindrical foam profile produced from the converging die shown in FIG. 4 is shown in cross-section in FIG. 5. Rod 500 has a foam core 510 surrounded by a solid skin 520 of the same composite compound, with the foam having expanded inwardly to the middle of rod 500. The dimensions of the die and the conditions of extrusion determine the resulting thickness of the skin and the density of the core. The moisture released by the wood fibres helps to reduce the temperature of the core, thus reducing the external cooling requirements. This spontaneous endothermic process is important in thicker extruded sections.

FIG. 6 shows curves for two integral structural foams produced according to Example 1 (PP/RH) and Example 2 (PS/WF) compared with solid, oriented profiles of high density polyethylene (HDPE) containing wood flour (a finely divided filler derived from sawdust). The three separate curves are for the same compound extruded through three different converging dies and having inherent draw ratios of 3:1, 5:1 and 14:1, respectively. The integral foams compare favourably with the corresponding solid profiles in both strength and modulus due to the solid oriented skin of the resulting structural foams.

For reference, an injection molded specimen of HDPE containing 25 percent thermomechanical pulp (TMP) is identified in the lower left hand quadrant of the graph as PE/TMP (Injection). In general, it is more difficult to injection mold compositions of TMP greater than 40 percent by weight, whereas the practical limit for extrusion orientation is 80 percent by weight cellulosic filler. This is due to the greater ability of extrusion processes to process highly viscous compositions compared to conventional injection molding.

LUBRICATION

To achieve stiffness and density values comparable to wood it is not sufficient to extrude resin composite compositions under melt phase conditions as normally practiced in industry. Under conditions normally employed in industry there is not sufficient fiber orientation or molecular orientation retained in the extrudate to approach typical mechanical properties of common woods, ie. 10 GPa flexural modulus and 100 MPa flexural strength. By reducing the temperature of the melt so that it becomes highly viscous and elastic, the extrudate may be oriented in the converging die, thereby significantly increasing the mechanical properties. Without lubrication, pressures in the die can become excessive and cause mechanical failure of the mandrel or die. It should be cautioned that the common interpretation of "lubricant" as applied to plastics processing may not be appropriate in this context. Lubrication in this context applies strictly to the reduction of friction between the plastic melt and the die as in the case of metal extrusions. The rate of strain throughout the die must be maintained below a critical value to prevent polymer melt fracture. Thus, the die convergence is gradual and preferably less than about 20 degrees and more, preferably, less than 15 degrees (half angle), at its maximum slope. All internal surfaces must be highly polished to minimize friction. Since certain resin additives including moisture may be corrosive or abrasive under these conditions, the choice of alloy for the die requires proper consideration. The ability to melt phase extrude using lubricated flow at relatively low temperatures offers several important advantages including:

(a) increased production rates since less cooling time is required, especially for thick sections;

(b) precise control of extrudate dimensions;

(c) reduced energy consumption;

(d) greatly increased mechanical properties in the extrudate;

(e) ease of extruding highly viscous materials not normally processable;

(f) ability to extrude with large filler concentrations; and (g) reduced heat history for heat sensitive materials.

FOAMING AGENTS

In many applications a solid extrudate is preferred since a high extrudate density may not be undesirable. However in practise there are many other applications where a low density is important for economy as well as weight efficiency. In order to retain the desirable mechanical properies of a solid extrudate and at the same time reduce the density it is convenient to produce either a hollow profile or a structural foam such that the bending moment is maximized. This is illustrated in FIG. 2 wherein the extrudate passes through a water cooled calibrator 122 having inlet 124 and outlet 126. In the process shown, the warm extrudate is cooled and solidified on its outer surface whereas the hotter core is allowed to foam inwardly to fill the cavity under low atmospheric pressure. The foaming action is promoted by the proper choice of commercial blowing agent of either endothermic or exothermic type, recommended for such thermoplastics. In these examples, the natural moisture content of the cellulosic filler is normally sufficient to effect foam expansion without added chemical blowing agents. For reproducible results the moisture content of the cellulosic compound should be carefully controlled.

The choice of other foaming agents—endothermic, exothermic, physical or chemical, will depend upon several factors, including extrusion temperature, type of resin and cost. Residual moisture in the wood fibres is usually sufficient to impart the desired degree of expansion so that blowing agents need not be employed. Wood fibres are hygroscopic and will absorb moisture from the air if not adequately protected. Under normal circumstances, wood fibres in equilibrium with air may contain 3–7 percent moisture, the precise amount depending upon the humidity. Some of this adsorbed moisture will be vaporized during mixing, but a sufficient proportion can be retained to permit foam expansion of the wood fibre composites during extrusion. The release of adsorbed water vapour occurs immediately after the molten extrudate enters atmospheric pressure so that the molten extrudate may expand to several times its compressed volume, thereby lowering the temperature, via endothermic vapourization of the adsorbed moisture. If a hollow extrudate is led into a water cooled vacuum sizer (or sizing die) the molten interior can be caused to foam while the cooled surface remains solid and unexpanded. Such continuous foam profile extrusion methods are well known in the plastics industry but without such oriented skin as described in this solid phase extrusion process. It is the imparted orientation that confers the extra strength and stiffness needed to simulate the properties of wood.

The use of a vacuum sizer or sizing die permits control of the final dimensions and foam densities of the extruded profiles according to design. The solid (unexpanded) skin effectively seals the outer surface and produces a tough durable finish. However the skin is not so thick that it will prevent nails and screws from being inserted similar to that of wood. The combination of fiber orientation and molecular chain orientation can produce structural foams surpassing the flexural properties of wood under ideal conditions.

The semi-solid extrudate is then cooled by a series of calibrators or water sprays. Tension is normally applied to the extrudate in order to increase the rate of extrusion and reduce die head pressure. The extruder may be one of many different types generally classified as single screw or twin screw.

The temperature profile in the extruder is carefully adjusted to permit adequate softening and mixing of the resin composition in the screw section without encountering excessive torque. The die temperature is generally a few degrees above the softening point of the resin compound, e.g. 1°–10° C., preferably 2°–5° C. The optimum temperature of each section will depend upon several factors which include the thermal conductivity of the resin mix, the rate of extrusion, the size and complexity of the extrudate, the heat of deformation, and the frictional constraint. The calibrator is designed to cool the extrudate as rapidly as possible in order to preserve the imparted orientation and prevent die swell. After solidification, the extrudate passes through a puller and is cut to the desired length.

CALIBRATOR

The function of the calibrator is to cool the surface of the extrudate and accurately maintain the final dimensions of the extrudate until the surface has fully solidified. In some applications, the calibrator will control the outside dimensions of a foaming extrudate and maintain a solid skin of predetermined thickness in the extrudate. The thickness of the skin is determined by die design, operating conditions and the choice of formulation. Such foamed extrudates are commonly known as integral structural foams. In other types of foamed extrudates, the skin may comprise a different polymer which is applied by coextrusion.

DISPERSING AGENTS AND COUPLING AGENTS

To promote complete and uniform dispersion of the wood fibres it is desirable to employ surface active agents which preferentially wet the surfaces of the wood fibres and thereby increase the rate of dispersion of wood fibres in the molten polymer matrix. These surface active agents may also provide increased adhesion (coupling) between the surface of the wood fibre and the matrix polymer if properly selected. Thus it has been found useful to employ carboxylated polyolefins as dispersing agents and/or coupling agents in polyolefin composites, as for example in U.S. Pat. No. 4,442,243,—R. T. Woodhams, issued Apr. 10, 1984. For example, maleated polyethylenes are effective dispersing agents for polyethylene composites, whereas maleated polypropylenes are more effective with polypropylene composites. The polar acidic functional groups of the polyolefin waxes preferentially wet or react with the cellulosic fibres to increase their compatibility with the resin matrix. The quantity of dispersing agent required generally depends upon the total surface area of the wood fibre component and the percentage of surface coated, and is usually 1–5 parts by weight of the wood fibre constituent. The optimum amount is readily determined by experiment.

RESINS

The three most important resin classes are the polyolefins (polyethylene and polypropylene), vinyls (vinyl chloride homopolymers and copolymers), and styrenics (homopolymers and copolymers of styrene including ABS). All of these polymers may be converted into foamed products. The process is equally applicable to other thermoplastics having softening temperatures less than about 220° C. (ie. below the decomposition temperature of cellulose), for example, the acrylic resins (homopolymers and copolymers of acrylic monomers). The process applies equally to recycled or waste resins, and in special cases to comingled resins. The quality of the product may depend upon the composition and compatibility of the individual comingled resins.

CELLULOSIC COMPONENT

The use of high intensity thermokinetic mixing is an important aspect of this discovery, since the intense mixing action not only disperses the individual wood fibres, but further disintegrates them into tiny fragments. As a result, the quality of the wood fibre component is not particularly critical since even very short fibres may be usefully employed that otherwise would be considered of no commercial value for paper manufacture e.g. waste sludge from paper recycling and fines from pulp mills. Most forms of lumber (hardwoods and softwoods), plywood, sawdust, tree cutting waste, agricultural waste etc. containing a major proportion of cellulose may be usefully employed in this process. All forms of paper, cardboard, magazines, books, newpapers, telephone books, wrapping paper etc. may be converted into a finely shredded form. Minor quantities of binding adhesives, plastic coatings, inorganic fillers, starch sizes, etc. do not significantly affect the final properties of the extruded composite.

The process may also employ laminated cartons e.g. Tetra Pak beverage containers, which comprise a laminate of aluminum foil, cardboard and plastic. Wax treated cardboard, plastic coated cardboard milk containers, glossy magazine papers, and other forms of waste paper which are not particularly suitable for reconversion into paper or cardboard products may be usefully employed in this process. Thus the process is ideally suited for both waste plastics and waste paper utilization due to its ability to accommodate a wide variety of otherwise unusable waste materials. For economic reasons, the granulated (chipped) resins recovered from plastic bottles or film (prior to pelletizing) are preferred since pelletizing can substantially increase the resin cost.

MECHANICAL PROPERTIES OF WOOD FIBER COMPOSITES

Flexural properties were measured using the ASTM D-790 procedure. For circular extruded rods the supporting jig was modified as in ASTM D-4476 to accommodate the curvature of the test specimens. The Izod fracture toughness measurements followed the ASTM D-25 procedure.

The mechanical properties of extruded polyethylene wood fiber composites (WFC), polypropylene WFC and polystyrene WFC are summarized in Tables 1, 2, 3, and 4, respectively. At 50 percent wood fibre content, the flexural modulus values for these three polymeric composites were between 3 and 5 GPa.

The following examples will illustrate the method of manufacture.

EXAMPLE 1

This Example illustrates the manufacture of a circular polypropylene integral foam profile containing a cellulosic filler.

Polypropylene (50 parts Himont Profax 6631, MI=1.0) and a maleated polypropylene wax (4 parts Eastman Chemicals Epolene E-43, MW=4500 daltons) were precompounded in admixture with ground rice hulls (50 parts) in a high intensity thermokinetic mixer (Gelimat) and then granulated prior to extrusion. The moisture content of the mix was reduced to 3 parts per hundred compound to achieve the desired degree of foaming. The mixture was placed in the hopper of a 2.5 in single screw extruder (L/D ratio 24:1) equipped with the rod die assembly schematically depicted in FIG. 3. The horn shaped die with a nominal draw ratio of 7 tapered to an exit diameter of 2.54 cm. Two calibrators (10 in long) were each equipped with air cooling for individual temperature control. The circular mandrel (0.70 in diameter) was positioned in the center of the reservoir (2.0 in internal diameter) and the mandrel extended into the converging die. The lubricant (Dow Corning 200 silicone oil) was injected through two ports in the reservoir at a rate of 15 ml per hour.

A computer console (Barber Colman MACO 8000) regulated the temperatures and process conditions throughout the trial. Temperature settings in the die section were first elevated to initiate the process and gradually lowered to the final steady state conditions. After steady state was achieved, the temperature settings of the four zones in the extruder barrel were (upstream to downstream): 165°, 170°, 175°, 178° C. The adaptor, reservoir section, and converging die were maintained at (in order): 178°, 173° and 170° C. The pair of calibrators were set at 110° and 90° C. The extruder speed setting was 30 rpm giving an extrusion rate of 40 in/min. No water bath or puller was employed in this example although these would normally be used in commercial practice.

The circular integral foam profile with an outer diameter of 1.0 in had a rigid glossy skin with a cellular foam core. The mean density of the profile was 0.59 g/cm$^3$. The flexural modulus of the rod profile was 5.05 GPa.

EXAMPLE 2

The previous example was repeated with wood flour filled polystyrene instead of polypropylene. Crystal polystyrene (50 parts Huntsman Chemical PS 201, MI=5.0) was compounded with wood flour (50 parts) and polystyrene-co-maleic anhydride copolymer (4 parts Atochem 3000 A). The moisture content was adjusted to 3 parts per 100 compound to act as the foaming agent. The die assembly described in the previous Example 3 was employed. After steady state was achieved, the temperature settings of the four zones in the extruder barrel were (upstream to downstream): 178°, 181°, 183°, 185° C. The adaptor, reservoir section, and converging die were maintained at (in order): 185°, 185° and 185° C. The pair of calibrators were set at 157° and 110° C. The extruder speed setting was 40 rpm giving an extrusion rate of 50 in/min. No water bath or puller was employed in this example although these would normally be used in commercial practice.

The polystyrene integral foam profile had a smooth outer diameter with a cellular core. The flexural modulus of the profile was 6.46 GPa with a mean density of 0.62 g/cm$^3$.

EXAMPLE 3

Example 2 was repeated with a mica filler instead of wood flour. Polystyrene (50 parts Huntsman Chemical crystal PS 201, MI=5.0) and polystyrene-co-maleic anhydride copolymer (4 parts Atochem 3000 A) and a chemical blowing agent 0.5 parts Uniroyal Celogen AZ-130) were mixed with mica (70 parts L. V. Lomas Mica White 200) using a high intensity thermokinetic mixer (Gelimat). The extruder was equipped with a rod die as in the previous Example 2. After steady state was achieved, the temperature settings of the four zones in the extruder barrel were (upstream to downstream): 180°, 184°, 188°, 190° C. The adaptor, reservoir section, and converging die were maintained at (in order): 190°, 188° and 185° C. The pair of calibrators were set at 157° and 110° C. The extruder speed setting was 35 rpm giving an extrusion rate of 40 in/min. No water bath or puller was employed in this example. The integral structural foam profile had a solid glossy skin with a cellular core. The mean density of the profile was 0.71 g/cm$^3$.

EXAMPLE 4-9

The following non-limiting Examples 4 to 9 illustrate the method of manufacturing articles with solid profiles using the apparatus of FIG. 1 in which the mandrel has been removed.

Flexural properties were measured using the ASTM D-79 procedure modified according to ASTM D-4476 for circular extruded rods. Fracture measurements followed the ASTM D-256 Izod test procedure.

Spruce and White Pine were measured under the same test conditions as the wood fiber rod composites and provided a direct reliable comparison of the flexural modulus. Commercially obtained spruce (density 0.42 g/cm$^3$) had a flexural modulus of 7.12 GPa and White Pine (density 0.44 g/cm$^3$) had a flexural modulus of 9.46 GPa. These are useful values for reference. The mechanical properties of extruded polyethylene resin types containing various filler types are compared in Tables 1 and 2. The abbreviations shown in the Tables are summarized below.

POLYMER TYPES:

PE1:high density polyethylene (MI = 0.4 g/10 min)
PE2:high density polyethylene (MI = 5.0 g/10 min)
MB:recycled HDPE milk jugs
MC:recycled HDPE chips (mixed colors)
PP:polypropylene (MI = 0.8)
HIPS:high impact-polystyrene (MI = 13.5)
MIPS:medium impact polystyrene (MI = 19)
R:recycled polystyrene
SMA:poly(styrene-co-maleic anhydride) copolymer
PVC:poly(vinyl chloride) resin (K-value 58)

CELLULOSIC FILLERS:

TMP:thermomechanical pulp
GWP:ground wood pulp
DIN:deinked newspaper
GN:ground newspaper
WF:wood flour
GC:ground cardboard
CS:corn stalks
WS:wheat straw
RH:rice hulls

EXAMPLE 4

Four grades of high density polyethyene (HDPE), a blow molding grade (HDPE, MI=0.4 g/10 min), an injection molding grade (HDPE, MI=5), recycled milk jugs (MB) and mixed color chips (MC) were mixed with a variety of cellulosic fillers including thermomechanical pulp (TMP), ground wood pulp (GWP), wood flour (WF), ground cardboard (GC), deinked newspaper (GN), ground newspaper (GN), ground cornstalk (CS), ground wheat straw (WS), and ground rice hulls (RH). A maleated polyethylene wax dispersing agent (du Pont Fusabond MB 226D) was included in all the following examples at 4 percent of the cellulosic filler mass. The resulting densities of the extruded rods were approximately 1.1 g/cm$^3$. In those samples containing 50 percent cellulose filler (by weight) the 24 hour water absorption values were 0.1 percent at 25° C. and 1.0 percent at 65° C. with no observable swelling or warping.

EXAMPLE 4A

High density polyethylene (MI=0.4) was mixed in a Gelimat with four concentrations of thermomechanical pulp (TMP): 30, 40, 50 and 60 weight percent. The granulated compounds were extruded under solid phase conditions with the following temperature profile (T1 to T6): 135°, 165°, 150°, 145°, 140° and 120°. Two different dies (nominal draw ratios 3 and 5) were selected for this series. The screw speed was set at 20 rpm. The extrusion rate was 1 ft/min for the 3:1 die at a die head pressure of 1500 psig. The extrusion rate was 2 ft/min for the 5:1 die at a die head pressure of 300 psig. The rod diameters were 0.34 and 0.40 in respectively. The mechanical properties of the extruded rods are summarized in Table 1. The flexural modulus values for these rods are plotted versus the cellulose filler concentrations in FIG. 6.

EXAMPLE 4B

A parallel series of experiments were completed with a high density polyethylene (HDPE, MI=5) having a lower melt viscosity than the examples in 6a. The test results are shown at the foot of Table 1.

EXAMPLE 4C

This Example illustrates the use of recycled (post consumer) HDPE flake (unpelletized) instead of virgin resin. The results are summarized in Table 1. The extruded rods derived from HDPE milk jug flakes produced slightly greater mechanical properties than the HDPE chips (above) in this series.

EXAMPLE 4D

Injection molding grade HDPE (MI=5.0 g/10 min) produced comparable results to that of the HDPE blow molding grade (Table 1). These examples indicate that the solid phase extrusion process is relatively insensitive to the grade of HDPE resin used and yields comparable results.

EXAMPLE 4E

These examples illustrate the use of agricultural byproducts such as wheat straw (WS), corn stalks (CS), and rice hulls (RH) as alternate cellulosic fillers (instead of wood and paper). The raw materials were ground to fine powders (20–200 mesh) in a hammer mill before mixing with the resins. The test results are summarized in Table 2 and confirm that cellulosic fillers derived from agricultural sources are as effective as those derived from wood and paper for imparting high strength and modulus.

EXAMPLE 5

This series describes the solid phase extrusion of polypropylene-wood fiber composites. Extrusion grade polypropylene (MI=1 g/10 min) was compounded as previously described with 50 percent by weight thermomechanical pulp (TMP), and deinked newspaper (DIN) in another series. The temperature profile of the extruder and die assembly (T1 to T6) was 165°, 190°, 180°, 180°, 165° and 130° C. The mechanical properties are summarized in Table 3. The densities were approximately 1.05 g/cm$^3$.

EXAMPLE 6

This series describes the corresponding solid phase extrusion of polystyrene-wood fiber composites. Medium impact polystyrene (MIPS) and high impact polystyrene (HIPS) having MI values of 19 and 13.5 g/10 min respectively were compounded with thermomechanical pulp (TMP) at concentrations which varied from 20 to 70 percent by weight. A reactive polystyrene (polystyrene-co-maleic anhydride copolymer) was employed to aid dispersion (3 percent of wood fiber mass). The steady state temperature profile of the extruder and die assembly was (T1 to T6): 100°, 160°, 145°, 125°, 115°, and 100° C. The mechanical properties of the oriented extruded rods are summarized in Table 4.

EXAMPLE 7

This example describes the solid phase extrusion of PVC-wood flour (WF) composites. Recommended stabilizers and lubricants were added to the rigid PVC (K value 58) to aid processing. The wood flour concentration was 30 percent by weight. The temperature profile of the extruder barrel (T1 to T6) was: 145°, 195°, 185°, 175°, 150° and 105° C. The flexural strength and modulus of the extruded rod were 59 MPa and 3.6 GPa respectively. The ASTM Izod impact toughness was 3.7 kJ/m$^2$ (transverse to grain), which is typical of the increased toughness imparted by solid phase extrusion.

EXAMPLE 8

This example describes experiments with a commercial size 2.5 inch single screw extruder (Deltaplast Machinery Ltd.) with an L/D ratio of 24. A rod die with a nominal extrusion ratio of 5 and an 0.896 inch outer diameter was employed for the first series of experiments. High density polyethylene (du Pont "Sclair 58A", M1=0.4) mixed with 50 parts wood flour and 4 parts maleated polyethylene (du Pont "Fusabond" MB 226D, MI=2) was precompounded for this experiment. The temperature profile of the extruder barrel and die assembly was (T1 to T6): 135°, 160°, 150°, 135°, 135° and 100° C. The extruder screw was set at 10 rpm which gave an extrusion rate of 1 ft./min. The extruded product had a flexural strength and modulus of 90 MPa and 4.9 GPa respectively.

EXAMPLE 9

This example describes a similar solid phase extrusion process as in Example 6, but with a mica filler instead of a cellulose filler. Mica (L. V. Lomas Mica-White 200) having an average particle size of 35 microns and an aspect ratio of approximately 5 was selected for evaluation. High density polyethylene (M1=0.4 g/10 min) was selected as the plastic resin component with the minor addition of a polar processing aid (2 percent du Pont Surlyn 9970 relative to the amount of mica filler). The composites were extruded as described in Example 6 through a rod die with a nominal draw ratio of 5. The results are summarized in Table 5. The flexural strengths of these samples are similar to those containing cellulosic fibres, but their flexural modulus values were somewhat larger. The density of the mica composite was also larger than the corresponding cellulosic composite due to the greater density of mica compared to cellulose (2.8 versus 1.4 g/cm$^3$). The greater weight efficiency of wood fibre composites is important in transportation applications.

TABLE 1

Properties of Oriented Polyethylene - Cellulose Composites

| | Content of Wood | 3:1 Die | | | 5:1 Die | | |
|---|---|---|---|---|---|---|---|
| | | Izod | Flexural Properties | | Izod | Flexural Properties | |
| Samples | Fiber (%) | Impact (kJ/m$^2$) | Strength (MPa) | Modulus (GPa) | Impact (kJ/m$^2$) | Strength (MPa) | Modulus (GPa) |
| PE 1/TMP | 30 | 16.3 | 105.5 | 3.4 | 13.0 | 99.7 | 3.97 |
| PE 1/TMP | 40 | 18.7 | 106.4 | 3.5 | 12.7 | 100.4 | 4.15 |
| PE 1/TMP | 50 | 17.8 | 112.4 | 3.8 | 10.2 | 105.3 | 4.60 |
| PE 1/TMP | 60 | 19.0 | 128.5 | 4.5 | 7.2 | 94.7 | 4.87 |
| PE 1/GWP | 50 | 20.1 | 111.8 | 3.7 | 9.1 | 94.6 | 4.35 |
| PE 1/DIN | 50 | 13.3 | 88.7 | 4.5 | 13.6 | 101.3 | 4.20 |
| PE 1/GN | 50 | 17.0 | 63.8 | 4.2 | 14.6 | 114.7 | 4.60 |
| PE 1/WF | 50 | 18.0 | 104.9 | 3.7 | 11.8 | 93.4 | 4.10 |
| PE 1/WF | 70 | — | — | — | 9.3 | 85.9 | 4.93 |
| PE 1/GC | 40 | — | — | — | 15.1 | 99.7 | 4.61 |
| PE 1/GC | 50 | — | — | — | 14.6 | 101.2 | 4.34 |
| MB/DIN | 50 | — | — | — | 13.8 | 97.1 | 4.53 |
| MC/DIN | 50 | — | — | — | 12.8 | 86.5 | 3.78 |
| MC/TMP | 50 | — | — | — | 13.7 | 92.7 | 3.91 |
| PE2/TMP | 50 | — | — | — | 11.8 | 101.5 | 4.55 |

TABLE 2

Properties of Oriented Polyethylene - Cellulose Composites

| | Content of Wood | 5:1 Die | | | 14:1 Die | | |
|---|---|---|---|---|---|---|---|
| | | Izod | Flexural Properties | | Izod | Flexural Properties | |
| Samples | Fiber (%) | Impact (kJ/m$^2$) | Strength (MPa) | Modulus (GPa) | Impact (kJ/m$^2$) | Strength (MPa) | Modulus (GPa) |
| PE 1/WF | 50 | 11.8 | 93.4 | 4.1 | — | 97.0 | 7.9 |
| PE 1/WS | 50 | — | — | — | — | 82.0 | 5.4 |
| PE 1/CS | 50 | 10.3 | 103.7 | 4.9 | — | 79.0 | 4.6 |
| PE 1/RH | 50 | 13.2 | 101.9 | 4.7 | — | 103.6 | 6.5 |
| PE 1/RH | 60 | 10.1 | 90.6 | 4.8 | — | 86.5 | 5.1 |
| PE 1/RH | 70 | 8.9 | 86.8 | 4.5 | — | 70.4 | 4.2 |

TABLE 3

Properties of Oriented Polypropylene Containing Cellulosic Fillers

| | Content of Wood | 3:1 Die | | | 5:1 Die | | |
|---|---|---|---|---|---|---|---|
| | | Izod | Flexural Properties | | Izod | Flexural Properties | |
| Samples | Fiber (%) | Impact (kJ/m$^2$) | Strength (MPa) | Modulus (GPa) | Impact (kJ/m$^2$) | Strength (MPa) | Modulus (GPa) |
| PP/TMP | 50 | 11.2 | 105.6 | 3.5 | 11.1 | 104.5 | 4.00 |
| PP/DIN | 50 | 12.8 | 96.0 | 3.6 | 7.5 | 85.9 | 4.00 |

TABLE 4

Mechanical Properties of Wood Fibre Composites

| Samples | Content of Wood Fiber (%) | 3:1 Die Izod Impact (kJ/m²) | Flexural Properties Strength (MPa) | Flexural Properties Modulus (GPa) |
| --- | --- | --- | --- | --- |
| MIPS/TMP | 20 | 5.5 | 52.4 | 3.10 |
| MIPS(R)/TMP | 20 | 5.3 | 56.4 | 3.40 |
| HIPS(R)/TMP | 30 | 4.2 | 61.9 | 3.60 |
| MIPS(R)/TMP | 30 | 4.2 | 64.6 | 4.00 |
| MIPS(R)/WF | 50 | 3.9 | 62.0 | 4.90 |
| HIPS(R)/WF | 60 | 3.4 | 60.3 | 5.10 |
| MIPS(R)/WF | 70 | 2.7 | 55.4 | 5.60 |
| MIPS(SMA)/W | 60 | 3.3 | 54.0 | 6.20 |

TABLE 5

Polyethylene Extrudates Containing a Mica Filler

| Samples | Content of mica (%) | Concentration of Surlyn 9970 (wt % on mica) | Flexural Properties Strength (MPa) | Flexural Properties Modulus (GPa) |
| --- | --- | --- | --- | --- |
| Mica 200 | 40 | 2 | 91 | 4.3 |
| Mica 200 | 50 | 2 | 90 | 4.8 |
| Mica 200 | 60 | 2 | 108 | 7.1 |
| Mica 200 | 70 | 2 | 92 | 7.6 |
| Mica 200 | 70 | 4 | 100 | 7.2 |

I claim:

1. A process for the continuous production of a high modulus article comprising a composite of an oriented plastic material and from about 20 to about 80% by weight of an oriented particulate material, said process including the steps of:

(a) continuously extruding an orientable plastics material, while it is close to or at its softening temperature and in admixture with an orientable particulate material and a lubricating agent, through a converging passage of which the cross-sectional area diminishes in the forward direction of plastic flow to obtain substantially extensional flow of said admixture through said passage, thereby to produce an extrudate wherein said orientable particulate material is oriented parallel in said extensional flow of said mixture;

(b) deforming the extrudate, while it is maintained at or close to its melt temperature, to produce an oriented, deformed extrudate; and (c) cooling the deformed extrudate to preserve the orientation and provide a composite of high stiffness and high strength in flexure.

2. The process as claimed in claim 1 wherein said orientable particulate material is a cellulosic material.

3. The process as claimed in claim 1 wherein said admixture further comprises a blowing agent to provide said article comprising an integral structural foam.

4. The process as claimed in claim 3 wherein said blowing agent is water.

5. The process as claimed in claim 1 in which the plastic material is polyethylene having an weight average molecular weight of between 20,000–500,000 daltons.

6. The process as claimed in claim 1 in which the converging passage is provided in a die having a converging zone, which passage has a geometry which provides a decreasing strain rate of the elastic melt in the flow direction within the converging zone.

7. The process as claimed in claim 6 in which the converging passage in the die has a geometry which provides a constant elongation rate of the elastic melt in the flow direction within the converging zone.

8. The process as claimed in claim 1 in which the extrudate is deformed in the die while being drawn in the direction of its elongation.

9. A process as claimed in claim 1 wherein said particulate material is cellulosic fibers or cellulosic particles and said plastic material has a softening point below about 220° C. and the process further comprises:

intimately admixing said cellulosic fibers or cellulosic particles with said plastic material;

extruding the mixture with converging flow through a die at a temperature near the softening point of the thermoplastic material, to impart longitudinal orientation of both the cellulosic particles and the thermoplastic polymer molecules in the direction of extrusion;

and cooling the extrudate promptly after the orientation to solidify the extrudate and preserve the imparted orientation therein.

10. A process as claimed in claim 1 or claim 9 for the production of an integral structural foam composite of oriented plastic material and oriented particulate material, said process including the steps of intimately admixing a foaming agent, suitably orientable particulate material and a thermoplastic material which has a softening point below about 220° C.;

extruding the admixture through a converging die at a temperature near the softening point of the thermoplastic material, so as to impart predominantly longitudinal orientation to both the particulate material and the thermoplastic polymer chains throughout the melted extrudate and under conditions which permit foaming to take place in the core of the extrudate while maintaining a highly oriented, essentially solid outer skin on the extrudate surface, while applying tension to the extrudate to maximize extrusion rates and reduce die pressures; and cooling the extrudate promptly after exit from the converging die so as to form said outer skin, preserve the imparted orientation, prevent die swell and obtain the integral structural foam composite product.

11. A process for the continuous production of a high modulus article comprising a composite of an oriented plastic material and from about 20 to about 80% by weight of an oriented particulate material, said process including the steps of:

(a) continuously forcing an orientable plastics material, while it is close to or at its softening temperature and in admixture with an orientable particulate material through a converging passage of which the cross-sectional area diminishes in the forward direction of plastic flow;

(b) lubricating said admixture adjacent said passage to obtain substantially extensional flow of said admixture through said passage thereby to produce an extrudate wherein said orientable particulate material is oriented parallel in said extensional flow of said mixture;

(c) deforming the extrudate, while it is maintained at or close to its melt temperature, to produce an oriented, deformed extrudate; and (d) cooling the deformed extrudate to preserve the orientation and provide a composite of high stiffness and high strength in flexure.

* * * * *